United States Patent
Sadhvani et al.

(10) Patent No.: US 8,880,034 B2
(45) Date of Patent: *Nov. 4, 2014

(54) DATA SEGMENTATION PROFILES

(71) Applicant: Cellco Partnership d/b/a Verizon Wireless, Basking Ridge, NJ (US)

(72) Inventors: Rita Sadhvani, Watchung, NJ (US); Hannah Youngsil Moon, Boston, MA (US)

(73) Assignee: Cellco Patrnership, Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/071,203

(22) Filed: Nov. 4, 2013

(65) Prior Publication Data

US 2014/0066020 A1    Mar. 6, 2014

Related U.S. Application Data

(63) Continuation of application No. 13/223,992, filed on Sep. 1, 2011, now Pat. No. 8,588,749.

(51) Int. Cl.
| | |
|---|---|
| *H04M 1/66* | (2006.01) |
| *H04B 1/38* | (2006.01) |
| *H04M 1/00* | (2006.01) |
| *H04M 3/00* | (2006.01) |
| *H04M 1/725* | (2006.01) |
| *H04M 1/24* | (2006.01) |
| *H04M 1/64* | (2006.01) |
| *H04M 3/16* | (2006.01) |
| *H04M 1/68* | (2006.01) |
| *H04W 12/08* | (2009.01) |

(52) U.S. Cl.
CPC ............ *H04W 12/08* (2013.01); *H04M 1/24* (2013.01); *H04M 3/16* (2013.01); *H04M 1/64* (2013.01); *H04B 1/38* (2013.01); *H04M 3/00* (2013.01); *H04M 1/00* (2013.01); *H04M 1/68* (2013.01); *H04M 1/725* (2013.01); *H04M 1/66* (2013.01)

USPC ........ 455/411; 455/558; 455/550.1; 455/418; 455/412.2; 379/1.01; 379/67.1

(58) Field of Classification Search
CPC ............ H04B 1/38; H04M 1/00; H04M 1/64; H04M 1/66
USPC ................... 455/411, 558, 550.1, 418, 412.2; 379/1.01, 67.1

See application file for complete search history.

(56) References Cited

U.S. PATENT DOCUMENTS

| | | |
|---|---|---|
| 2007/0245006 A1 | 10/2007 | Lehikoinen et al. |
| 2008/0080688 A1 | 4/2008 | Burgan et al. |

(Continued)

OTHER PUBLICATIONS

VMware MVP (Mobile Virtualization Platform), Jul. 19, 2011 <http://www.vmware.com/products/mobile/overview.html>.
Blackberry Balance Technology Jul. 19, 2011 <http://us.blackberry.com/apps-software/business/server/full/balance.jsp>.
VMware Addresses Secrurity Concerns for Employee-Owned Devices with Virtual Mobile OS, Jul. 19, 2011 <http://telwares.worpress.com/2010/12/08/vmware-addresses-security-concerns-for-employee>.

(Continued)

*Primary Examiner* — Opiribo Georgewill

(57) ABSTRACT

A mobile communication device provides a user with the ability to set up one or more profiles on the device. Each profile is configured to segment the user's data and applications and selectively restrict access from an active profile to user data and applications associated with other profiles on the device. The mobile communication device stores profile configuration data including profile selection criteria used to automatically associate items of user data with profiles on the device. When an item of user data is received on the device, the device automatically identifies a profile to associate with the received item based on the profile selection criteria, and the received item is stored in the device so as to be associated with the identified profile. Exemplary profile selection criteria include criteria based on a current time or location, a currently active profile, a data type of the received item, and a source of the received item.

20 Claims, 5 Drawing Sheets

(56) References Cited

U.S. PATENT DOCUMENTS

| | | |
|---|---|---|
| 2008/0318616 A1 | 12/2008 | Chipalkatti |
| 2009/0156171 A1 | 6/2009 | Yasrebi et al. |
| 2009/0280859 A1 | 11/2009 | Bergh |
| 2009/0325562 A1 | 12/2009 | Hough et al. |
| 2012/0159139 A1 | 6/2012 | Kim et al. |

OTHER PUBLICATIONS

Manage BlackBerry smartphones without compromise: Introducing Blackberry Balance technology.

U.S. Appl. No. 12/977,615, filed Dec. 23, 2010.

Entire prosecution history of U.S. Appl. No. 13/223,992, filed Sep. 1, 2011, entitled "Data Segmentation Profiles."

*FIG. 4a*

New Profile
Name:
[ Cooking ]

Start Time:
[ 8 ] [ 00 ] AM

End Time:
[ 5 ] [ 00 ] PM

[X] Weekdays Repeat

| Back | Continue |

*FIG. 4b*

How would you like your "Cooking" profile activated?

● Automatically
Phone will automatically activate this profile during the specified time periods.

○ Manually
Profile will only be activated when you manually turn it on.

| Back | Continue |

*FIG. 4c*

Select the content you want kept separately:

[X] Pictures
[ ] Videos
[X] Text Messages
[X] Calendar
[X] Contacts
[ ] Call Logs

| Back | Save |

DATA SEGMENTATION PROFILES

RELATED APPLICATIONS

This application is a continuation and claims the benefit of U.S. application Ser. No. 13/223,992 Filed Sep. 1, 2011 entitled "DATA SEGMENTATION PROFILES," the disclosure of which also is entirely incorporated herein by reference.

BACKGROUND

In recent years, the capabilities of and uses for mobile communication devices have greatly expanded as smartphones, personal digital assistants (PDAs), and other types of advanced mobile communication devices have increased in popularity. While mobile communication devices have been used for voice calls and mobile messaging services (e.g., text messaging) for some years, the development of advanced messaging services (e.g., multimedia messaging) and data communication services (e.g., email and surfing the world wide web) have resulted in mobile communication devices being used for an increasingly wide variety of purposes. In many cases, today's users use some or all of the communication capabilities of a single mobile device for work, as well as to communicate with family, keep up with personal interest groups, engage in hobbies, store personal photographs and music, and other purposes.

For computers, individual user accounts provide multiple users the ability to share one computer while retaining the ability to store each individual user's data separately, to personalize the view and appearance of the user's desktop, and to install application programs for access and use only by one or more particular user accounts. User accounts on a computer, however, are linked to different users, such that each user has a single user account on the computer. In addition, while user account functionality is common on computers, such functionality has not transitioned to mobile communication devices at least in part because of limitations on storage space and processing power of mobile devices. User account functionality has also not transitioned to mobile communication devices because devices have traditionally been used by a single user, and devices have been used for limited types and numbers of purposes (e.g., to make and receive phone calls and text messages). Instead, mobile communication devices are configured for use by a single user, the user having access to all data and applications on the device once a general access password has been entered into the device. A need therefore exists for technology to enable a user to have multiple segmentation profiles on a mobile communication device, for example to allow the user to have separate profiles corresponding to different interests or purposes of the user and segment the user's data among the profiles.

Mobile communication devices are commonly used by users for both work and personal purposes, and two approaches have been developed to enable enterprise customers to maintain control of work-related data and applications on mobile communication devices. These approaches, however, are geared towards addressing security vulnerabilities in mobile devices that store or are configured for access to work-related email accounts or other work-related data or services. To address the security vulnerability, enterprises and their service providers have developed methods for remotely erasing all data from enterprise devices, for example when the devices are reported as being lost or stolen. Recognizing that mobile devices are commonly used for both work and personal purposes, however, enterprise users may not want to erase personal data from such devices. A server-based solution to this problem has been proposed for devices such as Blackberry devices. Enterprise users having a Blackberry Enterprise Server can use the server to classify enterprise and personal data and applications on mobile devices controlled by the enterprise, and to restrict access to the enterprise data and applications on the mobile devices. The solution, however, restricts classification to one of only two categories (i.e., work vs. non-work), cannot be initiated or configured by a user of the device, and requires a specialized server and communication with the server to classify data and enact access restrictions.

A second approach for allowing enterprise users to impose restrictions on mobile communication devices has been proposed. The second approach relies on a Mobile Virtualization Platform which runs two operating systems on the mobile device. A native operating system (OS) provides access to the device's built-in features, while a guest operating system contains the employee's work environment. Enterprise users may thus deploy a guest operating system platform on a user's device to provide access to enterprise data and applications, while retaining control of access restrictions on the enterprise data and applications running in the guest operating system. This second approach, however, is again limited to one of only two categories of data (i.e., work-related running on the guest OS, vs. non-work running on the native OS). Also, the second approach cannot be initiated or configured by a user of the device, and is computationally expensive by requiring dual operating systems on the mobile communication device, and separate applications running in each operating system. In addition, the virtualization platform approach requires a device with two phone numbers, such that data can be separately provided to each operating system.

Because of the shortcomings of existing approaches for separately categorizing work vs. non-work related content, a need exists to provide users of mobile communication devices with multiple profiles that are user-configurable and are implemented on the mobile communication device itself. In addition, the existing approaches are limited by being restricted to one of only two classification categories, by failing to enable a user to initiate and configure the classification categories and associated restrictions, and by requiring specialized servers and/or phone numbers to run. In addition, the existing approaches do not allow users to themselves restrict access to data or applications on a mobile device, for example to restrict access to personal data (e.g., family photographs) when the phone is being used for work purposes, or to segment and thereby organize a user's data according to the user's various interests, hobbies, social groups, or the like.

A need therefore exists to enable users to create and manage multiple profiles on a mobile communication device. A need exists for full user-control of the segmentation profiles, to enable users to customize each profile and select data and applications associated with each profile on the device. A need further exists to enable the automatic segmentation of data on a mobile communication device to be performed by the mobile device itself, for example when new data is received on the communication device.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIGS. 4*a-c* show screen-shots of an exemplary process for setting up data segmentation profile functionality on a mobile communication device.

DETAILED DESCRIPTION OF EXAMPLES

Figure 1:
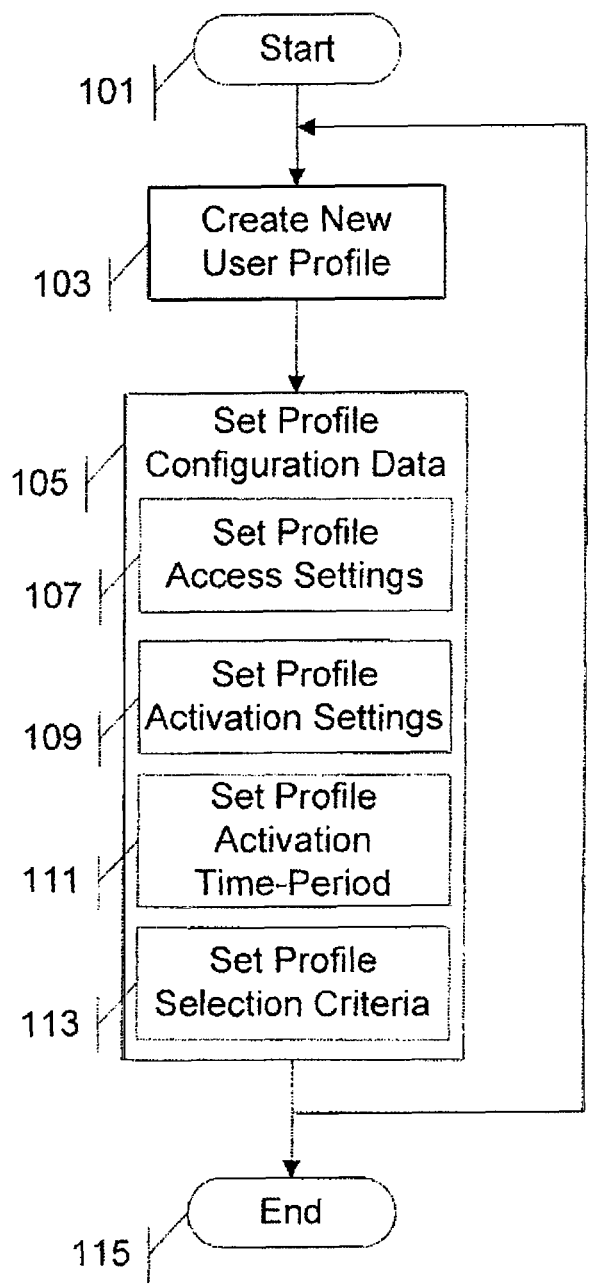
FIG. 1 is a flow diagram showing steps involved in a user setting up segmentation profiles on the user's mobile communication device.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The various methods and systems disclosed herein relate to providing user-configurable profiles on a mobile communication device for segmenting a user's data and automatically associating items of user data received on the device with a profile on the mobile communication device.

The mobile communication device stores profile configuration data for providing data segmentation profile functionality on the device. The profile configuration data includes configuration settings associated with the different profiles on the device. The profile configuration data also includes profile selection criteria which are used to associate items of user data received on the device with particular data segmentation profiles. When an item of user data is received on the mobile communication device, the device automatically determines a profile to associate with the received item based on at least one of the selection criteria. The device then stores the received item so as to be associated with the determined profile. The profile selection criteria can include one or more of a current time of week, a current location of the mobile communication device, a currently active one of the profiles, a data type of the received item of user data, and an identifier for the source of the received item of user data, for example.

Access to the item is generally unrestricted from the profile associated with the item, though various levels of access restrictions can be selected for limiting access to the item from profiles other than the profile associated with the item. Similar access restrictions can be enacted to block or limit access to applications on the device, such that access to the applications is restricted from profiles not associated with the applications.

A user may use a mobile device for business or work, as well as for hobbies, personal, and/or other purposes. A user may also want to share use of a mobile device with someone else, e.g. a family member, on a regular basis. For these or other similar reasons, a user may want to keep a separate profile for each purpose or for each user of a shared device. A profile is a set of parameters, settings, and/or data that jointly determine the appearance, configuration, and/or resources presented or available to a user of the mobile device when the profile is active on the device. Each profile has a set of stored profile configuration data including device and application parameters, settings, and/or data associated with the profile. The configuration data for a profile is used to 'configure' the device in a manner desired, e.g. by a user, for the respective profile. For example, the configuration data may identify a wallpaper of the profile, an application menu (or a set of application shortcuts) for the profile, parameters for a power saving mode of the profile, settings for an email account associated with the profile, etc. Each profile can further be associated with a different set of applications and/or of user data (e.g., a call log, stored pictures and documents, text messages, email messages, or the like). Access to user data, applications, and/or configuration data can be restricted between profiles, such that a user has access to user data, applications, and configuration data associated with a currently active profile from the currently active profile. However, access to user data, applications, and/or configuration data associated with other profiles may be restricted from the currently active profile. Some user data, applications, and/or configuration data can nonetheless be shared between profiles, such that they are fully accessible from a number of or all profiles on the device.

The mobile device switches between profiles either manually (i.e., by requiring a user selection), or automatically (e.g., based on a time of day, current location, a phone number of an incoming call/message, or the like). Access to data and applications between profiles may be restricted to varying degrees, from partial (e.g., for family photos that may be stored in or associated with a personal profile, but accessible from a hobbies profile) to complete separation (e.g., for confidential personal emails, which may exclusively be accessible from the personal profile). The restrictions on data access may depend on data type (e.g., a call log and a calendar may be shared between profiles, while pictures, text messages and contacts may be restricted to particular profiles). New data received or generated on the device is allocated to a profile based on one or more profile selection criteria based on a currently active profile, a time of day, a current location, the source of the data, or the like. Data can be moved from one profile to another by user commands.

With the approach outlined above, a user can configure one or more profiles on the user's mobile communication device to automatically segment the user's data (including newly received items of user data) among the one or more profiles. The user can configure the device to segment the user data stored and/or the applications installed on the device among the profiles to block or otherwise restrict access to user data and/or applications from profiles that are not associated with the user data and/or applications. The user can further configure the device to automatically activate a particular profile based on a current time, a current location, and/or other criteria.

Reference now is made in detail to the examples illustrated in the accompanying drawings and discussed below. FIG. 1 is a flow diagram showing steps involved in a user setting up one or more segmentation profiles on the user's mobile communication device.

The flow diagram of FIG. 1 begins at step 101 with an automatic or user-initiated start of the profile creation process. The profile creation process is automatically launched when the mobile communication device is first activated or turned on. Later, the profile creation process can be manually launched by selecting an option to activate profiles or to add one or more additional profiles on the device, e.g. from a settings menu on the mobile device. At step 103, a new profile is created on the mobile communication device, e.g. by adding an entry for the new profile in a list of profiles stored on the mobile communication device. In addition, a profile-specific entry (such as a configuration file or a folder to store a set of configuration files) can be created in a memory of the mobile communication device to store profile-related data, such as profile configuration data.

In a first example, a folder in a storage of the mobile communication device is created to store user data that has been segmented and associated with the new profile. In the example, the mobile communication device creates a new partition on the device's internal or external memory to store user data associated with the profile, and the device creates folders within the partition to store different types of data associated with the profile. The profile is also given a name or other identifier selected by the user (e.g., "Work" or "Cooking"). Hence, a "Work" partition on the device's memory may contain separate folders for "Documents", "Pictures", "Media", and "Email", while a "Cooking" partition may contain a similar set of separate folders. In the example, an additional "Shared" partition may be used to store user data that is associated with or shared between all profiles on the mobile device, and the "Shared" partition may contain a set of separate folders for storing user data of different types. In order to store user data that is associated with or shared between multiple (but not necessarily all) profiles on a mobile device, a second approach to storing user data is described in the following paragraph.

In a second example, the user data segmented and associated with different profiles on the user device is stored in a single partition or memory of the device. In the example, each item of user data contains an identifier for the one or more profiles the item of user data is associated with. The identifier may be stored in metadata associated with the item of user data, stored in a header of the item of user data, or the like. Thus, a document that is associated with three different profiles on the device would contain identifiers for each of the three profiles, while a document associated with a single profile would contain only the identifier for the single profile. Hence, to retrieve items associated with a particular profile, the mobile device identifies all items of user data containing an identifier for the particular profile. A hybrid approach for storing user data can also be used, in which user data is stored in a partition associated with a profile, and in which each item of user data includes an identifier for the one or more associated profile(s) the item is associated with.

The profile can be associated with a unique identifier assigned to the mobile communication device, such as mobile identification number (MIN), a mobile directory number (MDN), an international mobile subscriber identification number (IMSI), or other identifier of the mobile communication device. In general, a mobile communication device has a single unique identifier (MIN, MDN, or IMSI) and the multiple profiles on the device are all associated with the same single identifier assigned to the device. In some examples, however, the mobile communication device has multiple assigned identifiers (e.g., multiple MINs, MDNs, or IMSIs, such as in mobile devices configured for concurrent use of multiple subscriber identity module (SIM) cards), and profiles on the device can be associated with different ones of the multiple unique identifiers. In one example, each profile is associated with exactly one of the unique identifiers (e.g., a "Work" profile is associated with a first MDN, while "Personal" and "Cooking" profiles are associated with a second MDN). In another example, each profile is associated with one or multiple identifiers (e.g., a "Work" profile is associated with a first MDN, a "Personal" profile is associated with the second MDN, and a "Cooking" profile is associated with both the first and second MDNs). In both examples, each of the unique identifiers may thus be associated with zero, one, or multiple profiles in the mobile device (e.g., a first MDN is associated with both the "Work" and "Cooking" profiles, a second MDN is associated with both the "Personal" and "Cooking" profiles, and a third MDN is associated with no profiles on the device).

Following creation of the profile, profile configuration data is set at step 105 by prompting the user for profile configuration settings, and/or by setting profile configuration settings to default values. The profile configuration data is stored in a memory of the mobile communication device.

The profile configuration data includes data on settings associated with the profile, such as lists of applications associated with the profile, identification of a wallpaper, color-scheme, or other user options associated with the profile, as well as application data such as server settings, usernames, and passwords for email, virtual private networking (VPN), and/or other accounts associated with the profile. Several specific examples of configuration data that may be selected during set-up are shown in steps 107-113. Additional or alternative configuration data may also be selected during set-up.

For example, a profile may restrict or block access to user data and/or applications that are associated with the profile from other profiles on the device based on access settings. Hence, the configuration data input steps in our example include an access settings input. In step 107, one or more access settings are set for the newly created profile. The access settings enable the user to select whether to restrict access to any user data and/or applications identified as being associated with the profile. Access settings are generally associated with a profile, and the access settings for the profile are applied by default to all user data and/or applications associated with the profile. However, individual access settings for particular items of user data and/or applications, for particular folders or storage locations, or for particular types of user data, can be modified by a user.

In our example, various access settings can be selected for a profile. A "full restriction" setting results in access to the user data and/or applications associated with the profile being fully blocked from access when the device is active in any other profile. A "password restriction" setting results in access to the user data and/or applications associated with a profile being blocked from access when the device is active in any other profile, but access to the user data and/or applications can nonetheless be obtained if a password is provided. A "prompt restriction" setting results in access to the user data and/or application being blocked, but access can nonetheless be obtained if the user chooses to access the data after a prompt indicating that the data is stored in or associated with a different profile than the active profile is presented to the user. A "no restriction" setting results in the data and/or application being accessible from any profile, or from user-selected profiles.

As part of defining access settings for a profile, a user may also identify content and/or applications that should be shared across multiple profiles. Input of access settings may thus include selecting the types of content and/or storage locations of content that should be shared (or, alternatively, kept separate) between profiles. For example, a user can set access settings to share picture data, text message data and/or applications, calendar data and/or applications, and contact data and/or applications between profiles on the device, and to keep separate video data and call logs. Additionally, the user could set access settings to share particular folders between profiles (e.g., imposing separate restrictions on a "personal pictures" folder to be shared between profiles and an "applications" folder to be kept separate) and/or to share particular applications between profiles (e.g., a text messaging application may be shared between profiles, while an application to access data on an enterprise server may only be accessible from a "Work" profile).

The setting of profile configuration data also includes selecting configuration settings that are common to all profiles on the mobile device, such as profile activation and profile selection criteria or settings. In step 109, a profile activation setting can be set. The profile activation setting is generally not profile specific but is instead shared across profiles on a device. The activation setting allows the user to select how profiles on the mobile communication device will be activated. The user can select an "Automatic" setting to cause the device to automatically become activated in a profile based on the profile activation time-period settings, for example. Under the "Automatic" setting, a profile becomes activated at the start of an activation time-period associated with the profile. For example, if a "Cooking" profile has an activation time-period set to weekdays from 8am to 5 pm, the "Cooking" profile will become activated on weekdays at 8am if the "Automatic" activation setting is set. Alternatively, the user can select a "Manual" setting if the user wants a profile to become activated only when the user manually activates the profile.

Other profile activation settings can also be selected. For example, a profile can have location configuration data associated therewith, the location data storing one or more areas or locations associated with a profile. If the profile activation setting is set to an "Automatic-location" setting, a profile can become activated if the mobile device's current location is detected as being in a location corresponding to the location data associated with the profile. Thus, a mobile device can automatically activate a "Home" profile when the mobile device is located within or proximate to a location associated with the "Home" profile.

In order for the mobile communication device to automatically activate profiles based on an activation time-period setting, the configuration data input step(s) in our example can include a time-period input for each profile. A profile activation time-period configuration setting defining one or more time-periods associated with the profile is performed at step 111. The profile activation time-periods are periods during which the corresponding profile is set to be active. In particular, each profile may be activated at the start of an activation time-period associated with the profile (i.e., when a current time matches the start time of a time-period associated with the profile). The profile activation time-period can define time periods that recur on a daily, weekly, monthly, or other time interval. For example, a user may select a time period for a "Cooking" profile to weekdays from a 8 am start time to a 5 pm end time, while a time period for a "Family" profile is set to every day from 6 am to 8 am and 5 pm to 8 pm, and a time-period for a "Hobbies" profile is set to weekdays from 8 pm to 11 pm. The activation time-periods for multiple profiles on the same device are generally mutually exclusive, to ensure that only a single profile is set to be active at a time if the "Automatic" profile activation setting is selected. A default profile can be selected by the user, such that the default profile is set to be active during time-periods when no other profile on the device is set to be active. In such an example, the default profile will be activated when the end-time of a current profile is reached, unless another profile is set to become activated at that time. Alternatively, a last active profile may remain active if no other profile is set to become activated after an end-time of the selected period for the last active profile is reached.

Finally, the configuration data input step(s) can include inputting of profile selection criteria. Profile selection criteria are criteria used to automatically associate user data received on the mobile communication device with respective profiles on the device. The profile selection criteria thus define one or more rules that are used to perform the automatic association of received user data to respective profiles. The selection criteria can also include a designation of a default profile with which received items of user data are associated if no other appropriate profile is identified based on the profile selection criteria. The profile selection criteria are set in the mobile communication device at step 113. Various types of profile selection criteria are described in more detail below in connection with FIG. 2. Profile selection criteria are generally shared between all profiles on a device, and need not be defined for each individual profile on the device.

While various examples of configuration data have been described in connection with steps 107-113, various other types of profile configuration data can be also be set by a user of the device. For example, a user may provide settings for e-mail or other accounts linked to the profile, provide a contact list for the profile, etc. A user may also select applications to associate with particular profiles, such that access to an application is restricted or blocked when the mobile device is activated in a profile that is not associated with the application.

Once the profile configuration data has been set in step 105, the mobile communication device may either return to step 103 to create and set-up an additional profile, or the device can proceed to step 115 to end the process of setting up profiles on the mobile communication device. Any number of profiles can be set up on a mobile communication device. For example, a user may set up three or more profiles on the mobile communication device, each profile separately segmenting different user data on the device according to the profile selection criteria defined by the user during setup. Once one or more profiles have been set-up, the mobile communication device is generally configured to be active in one (and only one) profile at any time.

The example of FIG. 1 relates to creating a new profile. Once created and set, however, the mobile device will typically provide access to a similar procedure to select an existing profile and modify any of the configuration data for and/or other settings associated with the existing profile.

Figure 2:
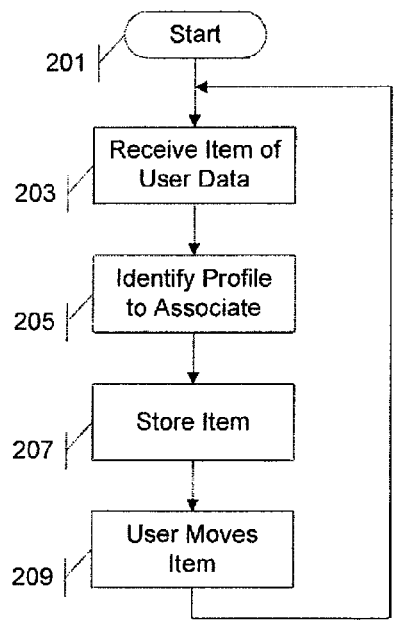
FIG. 2 is a flow diagram showing steps involved in automatically associating an item of user data received on a user's mobile communication device with one of the segmentation profiles of the mobile communication device.

FIG. 2 is a flow diagram showing steps involved in automatically associating an item of user data received on a user's mobile communication device with a segmentation profile of the mobile communication device.

The flow diagram of FIG. 2 starts at step 201 with the device monitoring whether any items of user data are received on the device. This monitoring runs until a new item of data is received, e.g. from the network or via the user interface on the device. At step 203, the mobile communication device receives an item of user data which generally includes a group of data packets such as a mobile messaging system (MMS) message (e.g., a short message service (SMS) message), a voicemail, a picture, or the like. Any of these exemplary items of user data can be received through a communication interface of the mobile communication device, or through a user interface of the device.

In response to receiving the item, the device automatically proceeds to perform steps 205-207. At step 205, the device automatically identifies a profile with which to associate the received item of user data, based on the profile selection criteria. Once an appropriate profile is identified, the device stores the item of user data so as to be associated with the identified profile, in step 207. For example, the device may store the item of user data in a folder or other storage location that is itself associated with the identified profile in a memory of the mobile communication device used for storing user data. The device may alternatively or additionally store the item of user data with a tag or other identifier associating the item with the identified profile (e.g., an identifier stored in a header or in metadata of the file, and/or stored in a file directory of a storage unit or of the device).

In a first example, an item of user data includes an identifier in a header of the item indicating the profile(s) associated with the item. The following table shows an exemplary item header listing two profiles associated with the item:

```
<Header>
    <AssociatedProfiles>
        <profile = "Work">
        <profile = "Personal">
    </AssociatedProfiles>
    ... Other Header Elements ...
</Header>
<Body>
    ... Item Contents ...
</Body>
```

In a second example, a file directory table stores associations of items of user data with profile(s) on the device. The following table shows an exemplary file directory including records for three exemplary items of user data stored on a mobile device, the table including a storage location and one or more profile(s) associated with each item.

| Item Name | Storage Location | Associated Profile(s) |
|---|---|---|
| Item1.doc | //Work/Documents/ | Work |
| Item2.eml | //Shared/Email/ | Personal; Work; Cooking |
| Item3.pic | //Shared/Pictures/ | Personal; Cooking |

In step 209, a user of the mobile device can optionally move the item of data between profiles, so as to associate the item of data with a different profile than the profile the item of user data was automatically associated with in steps 205-207. To move the item of data, the user may have to activate a profile from which the item of data can be accessed, select the item of user data, select a move option from a menu, and select a destination profile and/or a destination storage location for the item of user data. In the event that the user selects a destination storage location that is associated with a different profile from the profile currently associated with the item of data, the move command results in the item of data being moved to the destination storage location and results in the item of data being newly associated with the profile associated with the destination storage location. In the event that the user selects a destination profile for the item of data, the item may be moved from its current storage location to an appropriate storage location associated with the destination profile. For example, a photograph may automatically be moved to a "Pictures" folder associated with the destination profile. A successful move operation generally also involves both associating the selected item of data with a destination profile with which the item is newly associated, and dissociating the selected item from the source profile with which the item was originally associated. The device may then resume monitoring (step 201) whether any new item of user data is received on the device and return to step 203 when a new item of user data is received. In response to receiving a new item of user data, steps 205-207 are repeated to, for example, automatically identifying the same or a different profile with which to associate the new received item of user data based on the profile selection criteria and store, in the mobile communication device, the new received item of user data so as to be associated with the same or the other identified profile.

Various steps in the flow diagram of FIG. 2 may be added, eliminated, or substituted without departing from the scope of the invention. For example, the step of moving the item (step 209) may be eliminated, or replaced with an alternate step of sharing the item. Specifically, in order to associate an item of data with multiple profiles, the user can activate a profile from which the item of data can be accessed, select the item of user data, select a share option from a menu, and select a destination profile and/or a destination storage location with which to share the item of user data. A successful share operation generally involves associating the selected item of data with the destination profile or location with which the item is newly associated, but does not involve dissociating the selected item from the source profile with which the item was originally associated. As a result, following a successful share operation, the shared item is accessible both from the original profile and/or location the item is associated with and/or located in, and from the newly associated profile and/or location.

The profile selection criteria are a set of rules or settings that the mobile communication device uses in order to identify a profile with which to associate a received item of user data. The profile selection criteria can include criteria based on one or more of a time or location of the mobile communication device, a currently active profile on the device, attributes of the received item of user data, attributes of the source or destination of the received item, or the like.

In one example, the profile selection criteria can include a criterion to associate items of user data received during a particular time of day/week/month with a particular profile. In general, the time-period used as a profile selection criterion may be the same time-period as a profile activation time-period (such as the profile activation time-period selected at step 111). In such a case, an item of data received during a profile's activation time-period is associated with the profile. However, different time-periods could be set for profile selection and profile activation, and a step similar to step 111 may be used to allow input of one or more profile selection time-periods into the mobile device. According to the profile selection time-period criterion, an item of user data received at a current time of day/week/month is associated with a profile having a selection time-period which includes the current time. Alternatively, a profile selection criterion can associate items of user data received outside of the particular selection time-period with the particular profile. For example, a selection criterion may cause items of user data received during an 8 am-5 pm time-period on weekdays to be associated with a "Work" profile. Additionally or alternatively, a selection criterion may cause items of user data received outside of an 8 am-5 pm time-period on weekdays to be associated with a "Personal" profile.

A selection criterion based on device location can associate items of user data received when a current location of the mobile communication device is within a particular area with a particular profile. Setting-up of such a location-based selection criterion may include inputting of one or more geographical areas to be associated with a profile into the mobile communication device. The location-based selection criterion can alternatively associate items of user data received when a current location of the mobile communication device is outside the particular area with a selected profile. For example, a location-based selection criterion may cause user data received or originating from a camera on the device to be associated with a "Work" profile when the current location of the mobile communication device is within a geographical location (e.g. the device user's office) or area (e.g. an area including and surrounding the device user's office). Additionally or alternatively, a location-based selection criterion may cause camera data to be associated with a "Personal" profile when the current location is outside of a geographical area surrounding the device user's office. The location-based selection criteria may be set at step 113 of FIG. 1, for example. In one device, a location-based selection criterion may be set by inputting coordinates (e.g., GPS coordinates) for the location into the mobile device, by inputting coordinates of a point and a radius to define a circular area surrounding the point and corresponding to the location/area, or by inputting another location/area identifier (e.g., an identifier for a network base station or a femto-cell, for a WIFI base station, for a network extender, for a high-frequency audio signal associated with a location, or for any other wireless transmitter having a transmission range/area corresponding to the location criterion). In another device, a location-based selection criterion may be set by selecting an option on the mobile device to associate a current location of the mobile device with the profile.

A selection criterion can associate items of user data received when the mobile communication device is currently active in a particular profile with the particular profile, associate items of received user data having a particular data type (e.g., pictures) with a particular profile (e.g., a "Personal" profile), associate items of user data originating from a camera, microphone, or other component of the mobile communication device (and containing an identifier for the camera, microphone, or other component as a source or origin of the item) with a particular profile, associate items of user data received from a particular phone number (e.g., a voicemail, phone call, or MMS message) (and containing an identifier for the phone number as a source of the item) with a particular profile, and/or associate items of user data received for a particular destination (e.g., a particular destination application, destination e-mail account, or the like) with a particular profile. A profile selection criterion can also designate a default profile with which received items of user data are associated if the item of user data does not satisfy any other criterion.

If multiple profile selection criteria are input into the mobile communication device, a user of the device may be presented with an opportunity to define a priority order for the selection criteria. Alternatively, a default priority order can be defined, for example by assigning a default priority order based on the order that selection criteria are input into the mobile communication (e.g., giving a selection criterion input into the mobile device at an earlier time with a higher priority than selection criteria input into the device at later times). When a priority order is defined, a selection criterion given a higher priority is preferentially applied and overrides any lower priority selection criteria. As such, when multiple selection criteria are applicable to a received item of user data, and when the multiple applicable selection criteria identify different profiles to associate with the received item of user data, the item of user data is associated with the profile identified by the applicable selection criterion having the highest priority order. For example, if both a time-based selection criterion is defined to associate data received during the work day with a "Work" profile, and a higher priority source-based selection criterion is defined to associate data received from a camera with a "Personal" profile, data received from the camera will be associated with the "Personal" profile even when such data is received during the work day. In general, a profile selection criterion designating a default profile will be given the lowest priority of all profile selection criteria on the device.

Figure 3:
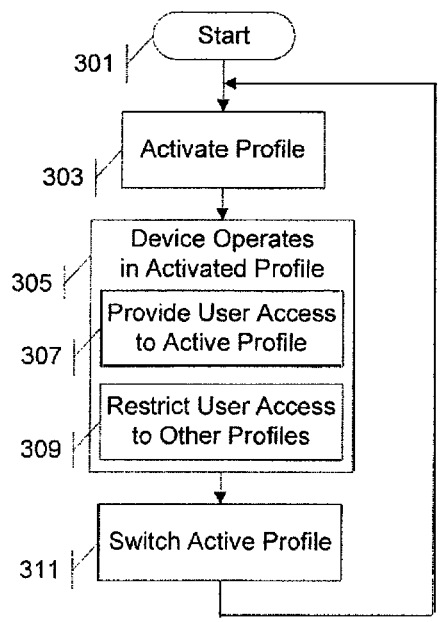
FIG. 3 is a flow diagram showing steps involved in activating a selected one of the segmentation profiles on a mobile communication device.

FIG. 3 is a flow diagram showing steps involved in activating a selected segmentation profile on a mobile communication device.

The flow diagram of FIG. 3 begins at step 301 with an automatic or user-initiated start of the user-profile activation process. The user-profile activation process can automatically be launched when a mobile communication device having one or more profiles configured thereon is activated or turned on. The activation process can also be initiated periodically (e.g., to verify whether a current time matches any profile's activation time-period start time, or whether a current location matches any profile's activation location data), or manually in response to a user request to change profiles. At step 303, a profile is identified for activation on the user device, and the identified profile is activated. The profile can automatically be identified for activation based on a profile activation time-period being matched to a current time of day/week/month, or a profile activation location being matched to a current location of the device. The profile can be manually identified for activation by a user, or activated through any other appropriate method for activating a profile.

Once a profile is activated, the mobile communication device operates in the active profile at step 305. While operating in the active profile, the device provides unrestricted access to all applications and user data that are associated with the active profile at step 307. However, the device restricts access to applications and user data that are not associated with the currently active profile at step 308. Items for which access is restricted are items associated with one or more other profiles defined on the mobile device. When a profile other than the profile associated with an item of user data is currently active on the mobile communication device, restrictions on accessing the item of user data are implemented to block user access. The access restrictions are generally determined by the profile access settings of the profile associated with the item of user data. For example, if the access restriction is "full restriction," access to the item of user data may be blocked when the active profile is not the profile associated with the item. However, if the access restriction is "no restriction," access to the item may be permitted from any profile.

In addition to restricting access to items of user data, the access restrictions can similarly block user access to applications on the device that are not associated with a currently active profile. By way of example, a user may be blocked from accessing a social networking application associated with a "Personal" profile when the device is active in any profile other than the "Personal" profile. In the example, a calendar application can be shared between profiles and accessible from any of the profiles on the device. The shared calendar application may only show the calendar user data (e.g., lists of appointments) that is accessible from the currently active profile. As a result, if calendar user data is not shared between profiles, a user accessing the calendar application will only be presented with the calendar data that is accessible from the currently active profile. However, if calendar user data is shared between profiles, the user will be presented with all of the shared calendar user data.

The access restrictions may also determine whether a user can see a particular file, folder, or application on the device, or whether files, folders, and applications can be hidden from view. In general, a user can see all data items, folders, and applications that are associated with a currently active profile (e.g., the items are presented to the user as icons on a display of the mobile device). However, in one example, items of user data, folders, and applications that are blocked from access are hidden from view in the currently active profile, such that a user cannot see the restricted items from the currently active profile. In this example, the user must activate the particular profile with which an item is associated in order to be presented with an icon or other indicator for the item. In another example, items of user data, folders, and application that are blocked from access are visible to a user, but the blocked items may be shown as having restricted access (e.g., by showing a padlock on an icon for the item).

The mobile communication device can switch between active profiles at any time, as shown at step 311. The device can switch to and activate a different profile in response to user-input, such as receiving a user command to activate a particular profile, receiving a user command to de-activate a current profile, or the like. The device can also switch to and automatically identify for activation a profile at a particular time based on a current time of week and/or based on a current location of the mobile communication device. The automatic identification can be performed in response to detecting that a current time corresponds to the start time of an activation time-period for a profile, or detecting that a current location corresponds to an activation location associated with a profile. In response to an automatic decision or a user command to switch profiles and identification of a profile for activation, the device returns to step 303 to activate a different identified profile.

In one example, a mobile communication device automatically changes an active profile based on a device location. The mobile communication device's profile activation setting is set to automatically activate profiles based on device location, and the mobile communication device stores location configuration data associated with a "Shopping" profile for activating the "Shopping" profile when the mobile device is in a store of a particular retail chain. The location configuration data includes an identifier for a radio or other signal (e.g., a high frequency audio signal) which is broadcast in stores of the particular retail chain. As a result, every time the mobile communication device enters a retail store of the chain, the mobile communication device detects the radio signal and automatically activates the "Shopping" profile.

FIGS. 4a-c show exemplary screen-shots of an exemplary process for setting up data segmentation profile functionality on a mobile communication device.

FIG. 4a is a screen-shot of a dialog box or the like for use in setting a time-period for a profile. As shown, a user can set a name for the new profile by selecting a Name text field shown in the dialog box on the display of the mobile device and typing in a name for the profile (e.g., "Cooking"). The user can touch the screen of the mobile device, use a trackball, use a keyboard, use a voice command, and/or use another appropriate input method to perform the selecting and typing. The user can further set a start time and an end time for the new profile, as well as select an option to repeat the same time schedule on all weekdays, by using an appropriate input method. The user can select Back or Continue buttons to navigate between various menu screens in order to set other profile configuration options and settings.

User selection of the Continue button may lead the user to be presented with a display such as the screen-shot shown in FIG. 4b showing a dialog box or the like for user setting of a profile activation setting. As shown, the user can select whether the "Cooking" profile should automatically be activated based on the time-period provided for the profile, or manually activated by the user. The user can choose one of the profile activation settings by clicking on or selecting a circle located next to the preferred setting. While only two activation settings are shown in the figure, additional or different settings can also be provided. For example, an additional setting for enabling automatic activation of a profile based on a current location of the device could be provided.

The profile activation setting selection screen has a Back button which, upon user selection, causes the mobile device to navigate back to a previous menu screen, such as the menu screen shown in FIG. 4a. The screen also has a Continue button which, upon user selection, causes the mobile device to display a next dialog box such as the dialog box or menu screen shown in FIG. 4c for selecting data access settings.

As shown in FIG. 4c, data access setting options allow the user to select content types that the user wants to keep separately in each profile. Unselected content types may be shared between profiles, and may thus have no restrictions on their access. The user can select content types that should be kept separately by clicking on or selecting one or more checkbox icons located next to respective content types listed in the dialog box. The user can select to keep picture, video, text message, calendar, contact, and/or call log data separately. The user is provided with a Back button to navigate back to a previous menu screen, such as the menu screen shown in FIG. 4b. The user is also provided with a Save button to save the configuration data the user has inputted into the device and complete the profile configuration set-up.

Figure 5A:
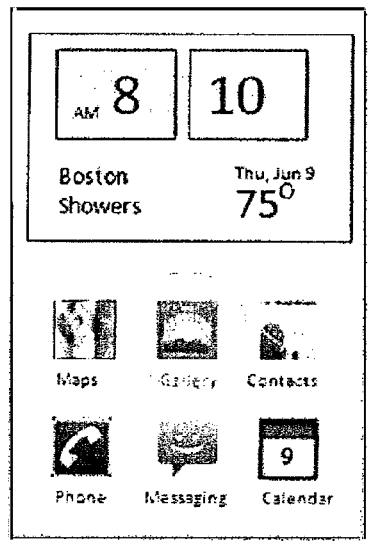
FIGS. 5*a-d* show screen-shots of an exemplary process for moving an item of user data to a selected profile on a mobile communication device.
Figure 5B:
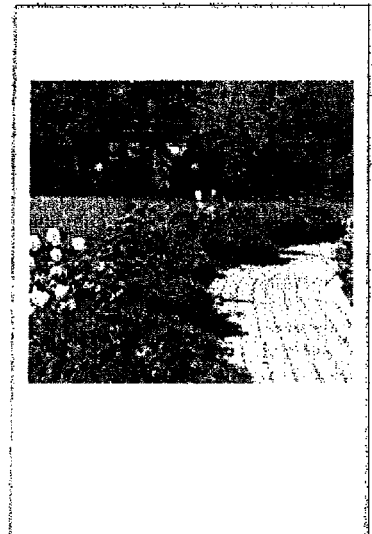
Figure 5C:
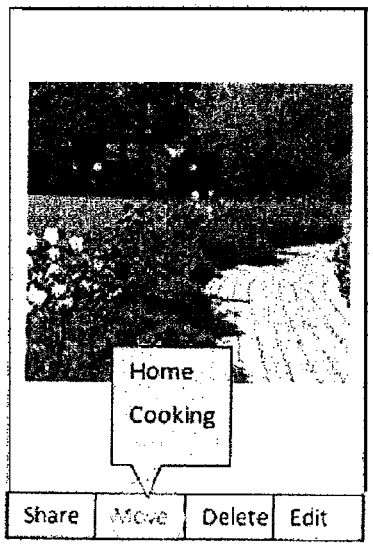
Figure 5D:
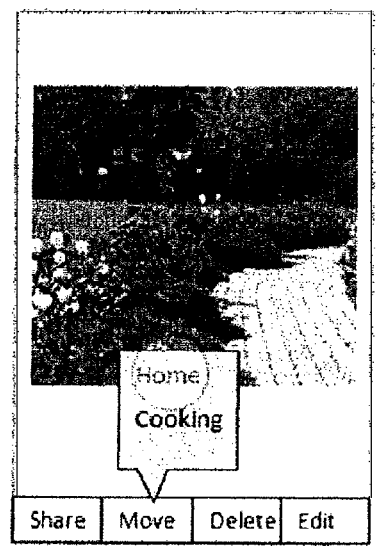

FIGS. 5a-d show screen-shots of an exemplary process for moving an item of user data to a selected profile on a mobile communication device. We will use a picture "Gallery" as an example of a device application in which a user can move an item between profiles. For example, a user may be presented with a general menu screen such as that shown in FIG. 5a, the menu screen including icons to activate various applications, such as "Maps," "Gallery," "Contacts," "Phone," "Messaging," and "Calendar" applications. In the example shown, only those applications associated with a currently active profile are shown. The user can activate the "Gallery" application by selecting an icon for the application from a menu screen, for example by touching the screen of the device at the location of the "Gallery" icon, or by selecting the "Gallery" icon with a trackball or keyboard command. Once the Gallery application is activated, an item of user data (e.g., a picture accessed from the Gallery application and associated with the currently active profile) can be selected for display by the user. FIG. 5b shows an exemplary screen-shot of the device showing the selected item of user data displayed on the screen. While the item is displayed, the user activates a menu on the device by touching a lower portion of the screen or pressing a key on the device. Once activated, the menu is displayed at the bottom portion of the screen (see FIG. 5c) and includes menu options such as "Share," "Move," "Delete," and "Edit". The user can select the "Move" option from the menu, as shown in FIG. 5 c. Upon selection of the Move menu-option, a list of profiles the item of user data can be moved to is displayed on the screen. The user can select a destination profile (e.g., a "Home" profile) from the list in order to move the item of user data to the selected destination profile, as shown in FIG. 5d. Once the user selects the destination profile, the item of user data can be moved in accordance with the procedure described in connection with step 209 of FIG. 2. For example, the device associates the item of user data with the destination profile, and may optionally dissociate the item of user data from the currently active profile. The device may also move the item of user data from a storage area associated with the currently active profile in a memory of the mobile communication device to a storage area associated with the destination profile.

Those skilled in the art presumably are familiar with the structure, programming and operations of various types of mobile communication devices. However, for completeness, it may be useful to consider the functional elements/aspects of an exemplary mobile communication device at a high-level.

Figure 6:
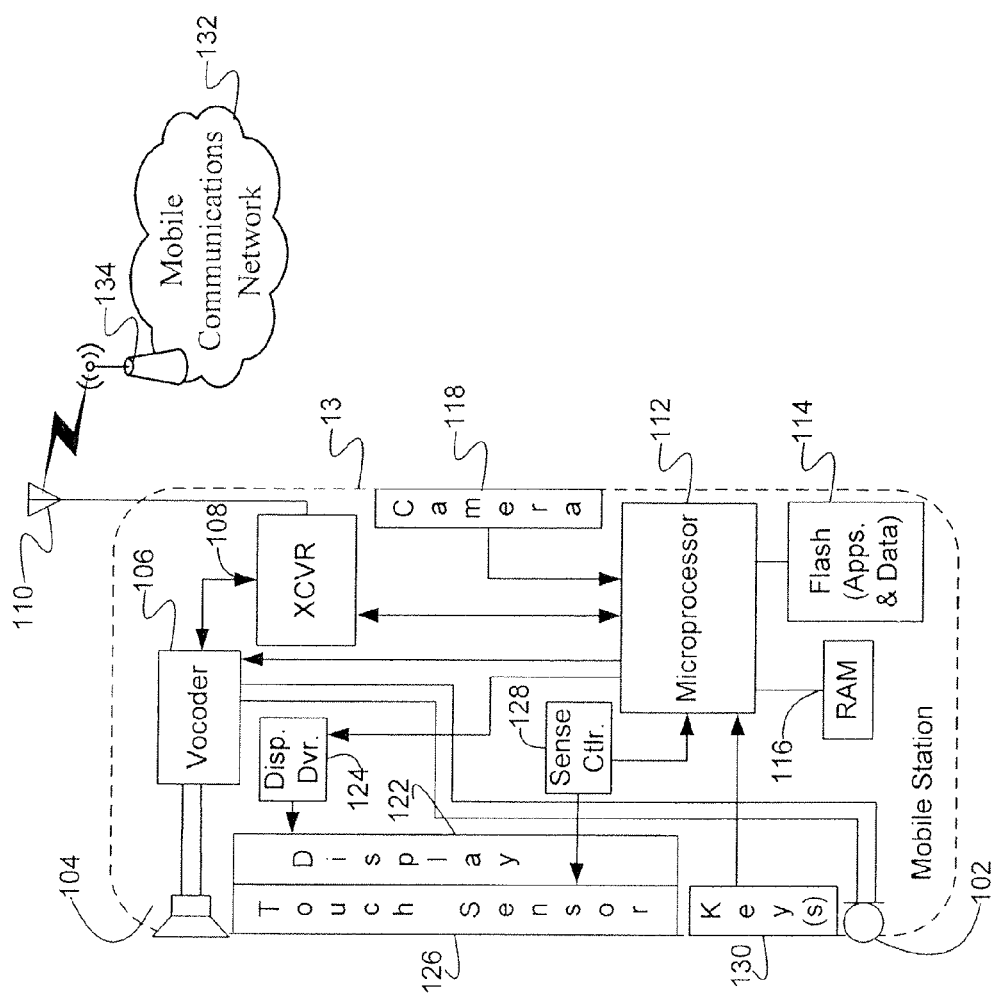
FIG. 6 is a high-level functional block diagram of an exemplary touch type mobile communication device as may utilize the data segmentation profile service and a network through which the device communicates.

For purposes of such a discussion, FIG. 6 provides a block diagram illustration of an exemplary touch screen type mobile communication device 13 as well as a high-level illustration of a network. Although the mobile communication device 13 may be a feature phone, smart-phone, a tablet computer, or may be incorporated into another device, such as a personal digital assistant (PDA) or the like, for discussion purposes, the illustration shows the mobile communication device 13 in the form of a touch screen type handset smartphone. The handset embodiment of the mobile communication device 13 functions as a normal digital wireless telephone station. For that function, the mobile communication device 13 includes a microphone 102, speaker 104 and vocoder 106, for audio input and output functions.

The mobile communication device 13 also includes at least one digital transceiver (XCVR) 108, for digital wireless communications, although the mobile communication device 13 may include additional digital or analog transceivers. Each transceiver 108 connects through RF send and receive amplifiers (not separately shown) to an antenna 110 for wireless communication through a base station 134 on a mobile communications network 132. The transceiver 108 supports voice communications over the network 132. In a smart-phone, the transceiver supports data communications over the network 132. The transceiver may also support communications for various types of mobile messaging services, such as short message service (SMS), enhanced messaging service (EMS) and/or multimedia messaging service.

A microprocessor 112 serves as a programmable controller for the mobile communication device 13, in that it controls all operations of the mobile communication device 13 in accordance with programming that it executes, for all normal operations, and for operations involved in the data segmentation profile procedures under consideration here such as operations described generally herein as being performed "by the mobile communication device." In the example of FIG. 6, the mobile communication device 13 includes flash type program memory 114, for storage of various "software" or "firmware" program routines and mobile configuration settings, such as program code for providing the data segmentation profile service, a unique identifier assigned to the mobile device (e.g., a mobile directory number (MDN) and/or mobile identification number (MIN)), profile configuration data, user data, etc. The device 13 may also include a non-volatile random access memory (RAM) 116 for a working data processing memory. Of course, other storage devices or configurations may be added to or substituted for those in the example. The memories 114, 116 also store various data, such as telephone numbers and server addresses, user data and downloaded data such as multimedia content, and various data input by the user. Programming stored in the flash type program memory 114, sometimes referred to as "firmware," is loaded into and executed by the microprocessor 112.

The segmentation of user data and applications in the memories 114, 116 can be performed in various manners. In one example, each item (e.g., user data and/or application) stored in memory has associated therewith an identifier for the one or more profiles to logically associate the item with the identified profile(s). The identifier may be included in a header for the item, in metadata for the item, or the like. In another example, different storage locations (e.g., memory partitions or folders in memory) are associated with different profiles, and items associated with each profile are stored in the corresponding storage location. A hybrid approach may also be used, in which each profile has a storage location associated therewith for storage of items associated with the profile, and in which each item stored in memory further contains an identifier for the one or more profiles the item is associated with. In the case of applications specifically, the mobile device may alternatively include a central storage for all applications on the device, and the device may store as part of the configuration data for each profile a list of those applications associated with the profile.

As outlined above, the mobile communication device 13 includes a processor, and programming stored in the flash memory 114 configures the processor so that the device is capable of performing various desired functions, including in this case the functions involved in the technique for providing and using data segmentation profiles. Mobile communication device 13 can also include additional hardware elements such as a camera 118 in communication with processor 112 for taking pictures using the device, and/or a global positioning system (GPS) unit (not shown), an assisted GPS unit, a GIS unit, or other means in communication with processor 112 for determining a current location of the mobile communication device.

Mobile communication device 13 further includes user interface elements such as a display 122, a touch sensor 126, and one or more key(s) 130. Other examples of mobile devices use other audio, visual, and tactile devices as elements of the user interface.

At a high level, the touchscreen display in our example is a user interface element that displays information to a user and can detect occurrence and location of a touch on the area of the display. The microprocessor 112 controls display 122 via a display driver 124, to present visible outputs to the device user. A sense circuit 128 senses signals from elements of the touch/position sensor 126 and detects occurrence and position of each touch of the screen formed by the display 122 and sensor 126. The display 122 and touch sensor 126 (and possibly one or more keys 130, if included) are the physical elements providing the textual and graphical user interface for the mobile communication device 13. The microphone 102 and speaker 104 may be used as additional user interface elements, for audio input and output.

The user interface elements enable normal telephone and data communication related input/output (including message input and message display functions). The user interface elements also are used for display of menus and other information to the user and user input of selections, including any needed for performing operations related to the data segmentation profile service discussed herein.

Aspects of the methods for providing data segmentation profiles outlined above may be embodied in programming for a mobile device such as device 13 shown in FIG. 6. Program aspects of the technology may be thought of as "products" or "articles of manufacture" typically in the form of executable code and/or associated data that is carried on or embodied in a type of non-transitory machine readable medium. "Storage" type media include any or all of the tangible memory of mobile devices or of computers, processors or the like, or associated modules thereof, such as various semiconductor memories, tape drives, disk drives and the like, which may provide non-transitory storage at any time for the software programming. As used herein, unless restricted to non-transitory, tangible "storage" media, terms such as computer or machine "readable medium" refer to any medium that participates in providing instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method of operating a mobile communication device, the method comprising steps of:

receiving, via a user interface, configuration data for a plurality of profiles to configure the mobile device by storing the profile configuration data in a memory, wherein the received profile configuration data includes profile selection criteria for automatically associating user data received on the mobile communication device with respective ones of the plurality of profiles;

receiving an item of user data having originated from one of a plurality of hardware components of the mobile communication device; and in response to receiving the item of user data on the mobile communication device:

automatically identifying, on the mobile communication device, one of the plurality of profiles to associate with the received item of user data based on the profile selection criteria, wherein the profile selection criteria associate the received item of user data with a profile based on from which hardware component of the plurality of hardware components of the mobile communication device the received item originated; and storing, in the mobile communication device, the received item of user data so as to be associated with the identified profile.

2. The method of claim 1, further comprising steps of:

enabling access to the received item of user data based upon the stored association, when the profile associated with the received item of user data is currently active on the mobile communication device; and restricting access to the received item of user data, when a profile other than the profile associated with the received item of user data is currently active on the mobile communication device.

3. The method of claim 1, wherein:

the mobile communication device is active in only one profile at any time; and the method further comprises a step of automatically selecting the profile in which the mobile communication device is active in at a particular time based on at least one of a current time of week or a current location of the mobile communication device.

4. The method of claim 1, wherein the profile selection criteria associate the item of user data with a profile based further on, when the item is received, at least one of:

a time of week;

an area that the mobile communication device is located within;

a profile which is active on the mobile communication device;

a data type of the item; and a phone number associated with the item.

5. The method of claim 1, further comprising steps of:

receiving another item of user data on the mobile communication device;

in response to receiving the other item of user data on the mobile communication device:

automatically identifying, on the mobile communication device, a different profile to associate with the other received item of user data based on the profile selection criteria; and storing, in the mobile communication device, the other received item of user data so as to be associated with the other identified profile;

enabling access to the other received item of user data based upon the stored association with the other identified profile, when the other identified profile is currently active on the mobile communication device; and restricting access to the received item of user data, when a profile other than the other identified profile is currently active on the mobile communication device.

6. The method of claim 1, wherein:
the profile configuration data further includes data associating particular applications on the mobile communication device with particular profiles; and
the method further comprises a step of restricting access to an application when a profile other than the profile associated with the application is currently active on the mobile communication device.

7. The method of claim 1, wherein the profile configuration data further includes profile access settings for selectively restricting access to user data associated with each profile, and profile activation time-period configuration settings for selectively defining time-periods for activating different profiles of the plurality of profiles on the mobile communication device.

8. The method of claim 1, wherein:
the profile configuration data includes a plurality of profile selection criteria; and
the plurality of profile selection criteria are ordered according to a priority order, such that when multiple selection criteria identify different profiles to associate with the received item of user data, the item of user data is associated with the profile identified by the selection criterion having the highest priority order.

9. The method of claim 1, wherein the profile selection criteria further include criteria for automatically associating the user data received on the mobile communications device with respective ones of the plurality of profiles based on one of: a telephone number, a destination e-mail address or a destination application associated with the received user data.

10. The method of claim 1, wherein:
the plurality of hardware components includes user input/output elements of the mobile communications device through which a user interacts with the mobile communications device,
the received item of user data contains an identifier of the hardware component from which the received item of user data originated, and
the step of automatically identifying comprises determining which of the plurality of profiles to associate with the received item of user data based on the identifier.

11. A mobile communication device comprising:
a memory
profile configuration data for a plurality of profiles stored in the memory, the profile configuration data including profile selection criteria for automatically associating items of user data received on the mobile communication device with respective ones of the plurality of profiles;
a communication interface for receiving items of user data on the mobile communication device;
a user interface;
a plurality of hardware components of the mobile communication device for originating items of user data; and
a processor for executing instructions, wherein execution of the instructions by the processor configures the mobile communication device to:
receive an item of user data having originated from one of the hardware components; and
in response to receipt of the item of user data:
automatically identify one of the plurality of profiles to associate with the received item of user data based on the profile selection criteria, wherein the profile selection criteria associate the received item of user data with a profile based on from which hardware component of the plurality of hardware components of the mobile communication device the received item originated; and
store, in memory of the mobile communication device, the received item of user data so as to be associated with the identified profile.

12. The mobile communication device of claim 11, wherein execution of the instructions by the processor further configures the mobile communication device to:
enable access to the received item of user data based upon the stored association, when the profile associated with the received item of user data is currently active on the mobile communication device; and
restrict access to the received item of user data, when a profile other than the profile associated with the received item of user data is currently active on the mobile communication device.

13. The mobile communication device of claim 11, wherein execution of the instructions by the processor further configures the mobile communication device to:
select one of the profiles to be an active profile and operate in accordance with the active profile; and
permit access to at least one item of user data stored in the mobile communication device associated with the active profile.

14. The mobile communication device of claim 13, wherein:
the mobile communication device is active in only one profile at any time; and
execution of the instructions by the processor further configures the mobile communication device to automatically select the profile in which the mobile communication device is active in at a particular time based on at least one of a current time of week or a current location of the mobile communication device.

15. The mobile communication device of claim 11, wherein the profile selection criteria associate the item of user data with a profile based further on, when the item is received, at least one of:
a time of week;
an area that the mobile communication device is located within;
a profile which is active on the mobile communication device;
a data type of the item; and
a phone number associated with the item.

16. The mobile communication device of claim 11, wherein the mobile communication device is assigned a unique identifier, and each of the plurality of profiles on the mobile communication device is associated with the unique identifier assigned to the mobile communication device.

17. The mobile communication device of claim 11, wherein execution of the instructions by the processor further configures the mobile communication device to:
receive another item of user data on the mobile communication device via the user interface;
in response to receipt of the other item of user data:
automatically identify, on the mobile communication device, a different profile to associate with the other received item of user data based on the profile selection criteria; and
store, in the memory, the other received item of user data so as to be associated with the other identified profile;
enable access to the other received item of user data based upon the stored association with the other identified profile, when the other identified profile is currently active on the mobile communication device; and restrict access to the received item of user data, when a profile other than the other identified profile is currently active on the mobile communication device.

18. The mobile communication device of claim 11, wherein:

the profile configuration data further includes data associating particular applications on the mobile communication device with particular profiles; and execution of the instructions by the processor further configures the mobile communication device to restrict access to at least one application on the mobile communication device associated with a profile other than the active profile.

19. The mobile communication device of claim 11, wherein:

the profile configuration data includes a plurality of profile selection criteria; and the plurality of profile selection criteria are ordered according to a priority order, such that when multiple selection criteria identify different profiles to associate with the received item of user data, the item of user data is associated with the profile identified by the selection criterion having the highest priority order.

20. A computer program product, comprising:

at least one non-transitory machine readable medium; and executable code embodied in the at least one medium, wherein execution of the code by a programmable processor of a mobile communication device causes the mobile communication device to perform functions, including functions to:

receive, via a user interface of the mobile communication device, configuration data for a plurality of profiles to configure the mobile device by storing the profile configuration data in a memory, wherein the received profile configuration data includes profile selection criteria for automatically associating user data received on the mobile communication device with respective ones of the plurality of profiles;

receive an item of user data having originated from one of a plurality of hardware components of the mobile communication device; and in response to receiving the item of user data:

automatically identify, on the mobile communication device, one of the plurality of profiles to associate with the received item of user data based on the profile selection criteria, wherein the profile selection criteria associate the received item of user data with a profile based on from which hardware component of the plurality of hardware components of the mobile communication device the received item originated; and store, in the mobile communication device, the received item of user data so as to be associated with the identified profile.

* * * * *